Aug. 19, 1958 M. SPECTOR 2,848,652
CIRCUIT FOR STARTING AND OPERATING DISCHARGE TUBES
Filed June 27, 1951
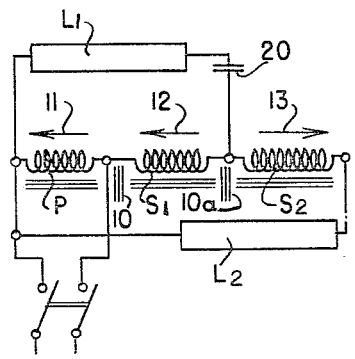
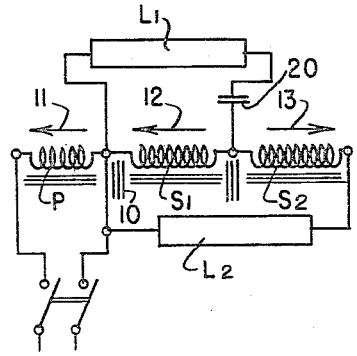
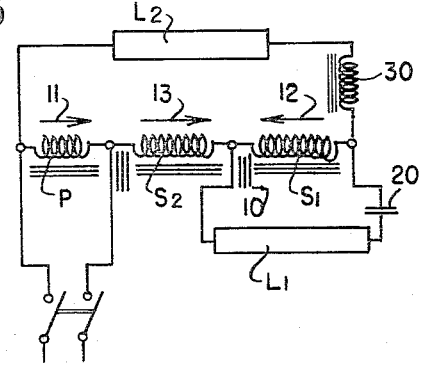
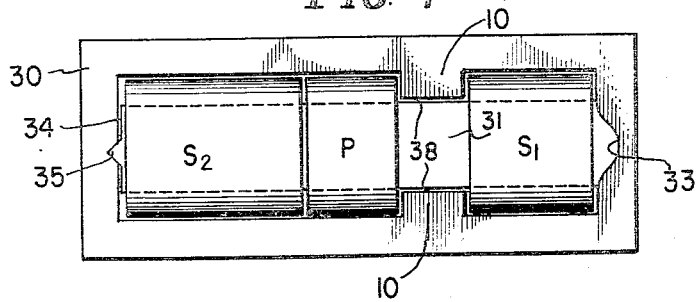
INVENTOR.
Morris Spector
BY *Morris Spector*
Atty.

United States Patent Office 2,848,652
Patented Aug. 19, 1958

2,848,652

CIRCUIT FOR STARTING AND OPERATING DISCHARGE TUBES

Morris Spector, Chicago, Ill., assignor to Advance Transformer Co., Chicago, Ill., a corporation of Illinois Application June 27, 1951, Serial No. 233,850

3 Claims. (Cl. 315—138)

This invention relates to circuits for starting and operating one or more discharge tubes of the hot cathode or cold cathode type.

There has recently been developed a ballast for starting two discharge tubes in sequence and thereafter operating them in series. Because the tubes are started in sequence the ballast need supply the starting voltage for only one of the tubes at a time, whereas in a two tube series circuit if the tubes were to start at the same instant the ballast would have to supply double the open circuit starting voltage required for a single lamp. Because of the sequential starting the high starting voltage is applied first to one and then to the other glow discharge lamp. The time lapse in the sequential starting is so slight that it is not noticeable and the lamps appear to start simultaneously. It is one of the objects of the present invention to provide a new and desirable circuit for a ballast of the above type which will start two lamps in sequence and then operate them in series.

It is a further object of the present invention to provide a new and useful circuit for starting and operating even one lamp and wherein the portion of the ballast circuit that is used to provide the high starting voltage is to all intents and purposes out of the circuit during the operating time. Since it is in circuit for only a negligibly small proportion of the total operating time the output efficiency of that portion of the ballast is not important and therefore that portion of the coil may be made of very fine wire, thereby reducing the amount of copper used and, in many instances, also reducing the amount of iron used in the ballast.

The attainment of the above and further objects of the present invention will be apparent from the following specification taken in conjunction with the accompanying drawing forming a part thereof.

In the drawing:

Figures 1, 2 and 3 are circuit diagrams illustrating different modifications of the present invention; and Figure 4 is a plan view of one form of ballast suitable for use with the circuits of the present invention.

In Figure 1 there is shown a circuit for starting and operating two glow discharge devices, which in this instance are fluorescent type instant start cold cathode lamps $L_1$ and $L_2$, by means of a ballast that includes a primary P, a secondary $S_1$ and another secondary $S_2$. The ballast may be of a physical construction such as shown in Figures 2 or 3 of the application of Albert E. Feinberg, Serial No. 135,669, that issued as Patent No. 2,558,293, June 26, 1951, to which reference may be had for a more complete description of the physical structure of the ballast. It is sufficient here to state that the ballast is a shell type iron core on which the three coils P, $S_1$ and $S_2$ are mounted, the secondaries being physically at opposite ends of the core with the primary between them. A magnetic shunt 10 is provided between the primary and the secondary $S_1$ and a similar magnetic shunt may be provided between the primary and the secondary $S_2$, the magnetic shunts including an air gap. The windings $S_1$ and $S_2$ have a high leakage reactance and both are loosely coupled with the primary, but the secondary $S_1$ is more loosely coupled to the primary than is the secondary $S_2$. The primary and the secondaries are so electrically connected that when alternating current voltage is supplied to the primary the relative directions of the induced open circuit voltages in the primary and secondaries $S_1$ and $S_2$ are as shown by the arrows 11, 12, and 13, respectively, namely, the direction of the secondary voltage $S_1$ is the same as that of the primary, whereas the direction of the induced voltage of the secondary $S_2$ is opposite that of the primary.

The lamp $L_1$ is connected in series with a condenser 20 across the primary and the secondary $S_1$, the secondary $S_1$ being, during the open circuit condition, in step-up auto-transformer relationship with the primary.

The instant that voltage is applied to the primary the combined voltages of the primary and the secondary are available to start the lamp $L_1$. On the other hand, at that instant the total voltage applied to the lamp $L_2$ is the voltage of the primary plus the voltage of $S_1$, minus the voltage of $S_2$. This is insufficient to start the lamp $L_2$. The lamp $L_1$ starts. The condenser is of smaller capacity reactance than the inductive reactance of the circuit including the primary, the secondary $S_1$ and the lamp $L_1$, so that current flowing in this lamp circuit is lagging. As soon as this lamp starts and current commences to flow through the secondary $S_1$ the high leakage reactance of the lagging current secondary $S_1$ induces therein a voltage having a component in a direction substantially opposite the direction indicated by the arrow 12. At this instant the voltage now applied to the lamp $L_2$ is the sum of the voltage of $S_2$ plus that reverse component of $S_1$ minus the voltage of P. This is sufficient to start the lamp $L_2$. Once the lamp $L_2$ starts, the lamp $L_1$ having already started, the two lamps $L_1$ and $L_2$ operate in series with the condenser 20 and are supplied with operating current by the secondary $S_2$.

Figure 2 shows an alternate circuit wherein the lamp $L_1$ in series with the condenser is connected directly across the secondary winding $S_1$, whereas the lamp $L_2$ is connected across the secondaries $S_1$ and $S_2$ in series. During starting the lamp $L_1$ has an initial voltage applied thereto equal to that of $S_1$. This is sufficient to start the lamp. The lamp $L_2$ has a voltage thereacross which is the difference between the voltage $S_i$ and the voltage of $S_2$. That is insufficient to start the lamp. Immediately upon starting of the lamp $L_1$ current commences to flow through the coil $S_1$. This current is a lagging current because the reactance of the condenser 20 is chosen of such a value as to be less than the inductive reactance of the secondary $S_1$. The lagging current flowing through $S_1$ induces therein a voltage having a component substantially opposite to that indicated by the arrow 12. The voltage across the lamp $L_2$ is now the sum of the voltages of $S_1$ and $S_2$ and that is sufficient to start the lamp $L_2$. Once the lamp $L_2$ starts current then flows through both lamps in series, the series circuit including the lamp $L_1$, condenser 20, secondary coil $S_2$ and the lamp $L_2$. The secondary $S_1$ is at this time shunting the lamp $L_1$ and the condenser 20. Due to the high leakage reactance of the secondary $S_1$ negligible current flows through the secondary $S_1$.

Figure 3 shows another modification of the present invention. In this instance the lamp $L_1$ and the condenser 20 are connected across the secondary $S_1$ which is of sufficient number of turns to provide a sufficient voltage for starting the lamp $L_1$. The condenser 20 is of a capacity reactance less than the inductive reactance of the winding $S_1$ plus the lamp $L_1$, so that the starting current flowing through the coil $S_1$ is lagging. The voltage across the transformer when the lamps $L_1$ and $L_2$ are open circuited is the sum of the voltages of the primary or line voltage plus the voltage of the secondary $S_2$, minus the voltage of the secondary $S_1$. This is insufficient to start the lamp $L_2$ which is connected in series with a choke 30. After starting of the lamp $L_1$ the lagging current flowing through the winding $S_1$ produces a reverse component of voltage therein which is now additive to the voltages of the primary P and secondary $S_2$ and is sufficient to start the lamp $L_2$. The lamp $L_2$, in series with the choke 30, lights. Once this happens a circuit is formed including the lamp $L_2$, choke 30, condenser 20 and lamp $L_1$ in series, connected across the primary P and secondary $S_2$ in series. The primary P and secondary $S_2$ are in step-up auto-transformer relationship. The secondary $S_1$ at this time shunts the lamp $L_1$ and condenser 20. Due to the high leakage reactance of the secondary $S_1$ this shunt circuit takes a negligible current. The choke 30 is a conventional iron core choke such as is commonly used in fluorescent lamp circuits. It may comprise, for instance, an E-shaped magnetic core having a winding 30 on the center leg and a bridging bar of iron extending across the three legs of the E to complete the magnetic circuit.

In each of the circuits above described there is shown an arrangement for starting two glow discharge lamps in sequence and operating them in series. Each of the circuits is operative for controlling a single lamp if desired. In such case the respective circuits are used for operating the lamp $L_2$, the lamp $L_1$ being omitted and, when omitted, being replaced by the equivalent of a short circuit across the terminals of the lamp $L_1$. Thus, in Figure 1 the condenser 20 would be connected directly across the primary P and secondary $S_1$. In Figures 2 and 3 the condenser 20 would be connected directly across the secondary $S_1$. In each such circuit the operation would be as previously explained, that is, when line voltage is applied it first induces a current flow through the condenser 20 in series with its associated coil $S_1$. The current is a lagging current because the capacity reactance of the condenser 20 chosen is less than the inductive reactance of the circuit which includes the condenser, and the lagging current results in a reverse component of voltage in the secondary $S_1$. This then provides a sufficient voltage for starting of the one lamp $L_2$. Upon starting of the lamp $L_2$ the condenser 20 operates in series, with the lamp $L_2$ being shunted by the winding $S_1$ in Figures 2 and 3, and by the winding $S_1$ and P in Figure 1.

While I have herein shown the present invention as applied to instant start for cold cathode tubes, it is within the purview of the present invention to apply the principles thereof to hot cathode tubes by providing a conventional heating circuit for the filaments of the tubes.

In Figure 4 I have shown one form of ballast that may be used in connection with the present invention, this being one of the two ballasts shown in the Feinberg patent above referred to. In this construction the ballast comprises a rectangular core 30 formed by a stack of iron transformer laminations, and a similarly formed central core leg 31 on which the windings $S_1$, P and $S_2$ are located. The central core leg makes a snug fit with one end of the shell, as indicated at 33, and provides at the opposite end 34 a gap in the magnetic circuit, which gap is bridged at 35, for reasons well known in the art. The core 30 has magnetic shunts 10—10 which approach the central core member 31 and are spaced therefrom by air gaps 38—38. If desired shunts 10a—10a (Fig. 1) similar to the shunts 10—10 may be provided between the primary P and the secondary $S_2$. The secondary $S_1$ is of finer wire than is the secondary $S_2$. The secondary $S_1$ may have of the order of four times as many turns as the primary, whereas the secondary $S_2$ may have a number of turns two and one-half times that of the primary. This is merely by way of example, as other relative ratios may be chosen depending upon which of the circuits are used, and depending upon the constants of the circuits in accordance with known engineering principles.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. In combination, a pair of gaseous discharge devices, an alternating current supply for the devices comprising a three-winding auto-transformer having a primary, a loosely coupled first secondary having one end connected with the said primary, a loosely coupled second secondary, the said first secondary having its second end connected with the second secondary and in bucking voltage relationship to the second secondary, means including a capacitive reactor connecting one of said devices across the first secondary and excluding the primary, means connecting the second of said devices excluding the primary and including the first and second secondaries, and means for connecting said source across the primary, the secondaries having a turn relationship to the primary to cause seriatim ignition of said first and second devices, and the reactance of the first secondary being very high relative to the second secondary whereby after the said devices are both operating the apparatus will form in effect a series circuit including the devices, the capacitive reactor, and the second secondary.

2. In combination with two gaseous discharge devices, an auto-transformer having a primary, a loosely coupled high leakage reactance first secondary of more turns than the primary, and a second loosely coupled high leakage reactance secondary of more turns than the primary and arranged in bucking relation to the first secondary, said primary and said first secondary and said second secondary being connected one after the other, means including a capacity reactor connecting one of said devices in a circuit excluding the primary and the second secondary and including the first of the two secondaries, and means connecting the second of said devices in a circuit excluding the primary and including the two secondaries.

3. A system of the character described comprising a transformer having a primary winding, a first secondary winding and a second secondary winding, both secondaries being loosely coupled to the primary, the first secondary being connected between a terminal of the primary and a terminal of the second secondary and in bucking voltage relationship to the second secondary, a capacitive reactor, an instant start gaseous discharge device in series with the capacity reactor and connected across the first secondary and excluding the other two windings, a second instant start gaseous discharge device connected across both secondary windings and excluding the primary winding, the secondaries having a turn relationship to the primary whereby the first of said devices will be ignited when power is applied to the primary causing a lagging flow of current through said first secondary, which in turn will produce a component of voltage in said first secondary in phase with the voltage of the second secondary such that the sum of voltages across the two secondary windings after ignition of said first device is sufficient to ignite the second of said devices, the said first secondary having a relatively high leakage reactance greatly to limit the flow of operating current therethrough.

References Cited in the file of this patent

UNITED STATES PATENTS

| | | |
|---|---|---|
| 2,298,935 | Freeman | Oct. 13, 1942 |
| 2,370,635 | Bridges | Mar. 6, 1945 |
| 2,382,638 | Keiser | Aug. 14, 1945 |
| 2,518,767 | Freeman | Aug. 15, 1950 |
| 2,558,293 | Feinberg | June 26, 1951 |
| 2,568,553 | Mauerer | Sept. 18, 1951 |